United States Patent
Mitchell et al.

(10) Patent No.: US 11,549,628 B1
(45) Date of Patent: Jan. 10, 2023

(54) INSERT VALVE CUT WARNING SYSTEM

(71) Applicant: Mueller International, LLC, Atlanta, GA (US)

(72) Inventors: Timothy J. Mitchell, Hixson, TN (US); Samantha Ellen Covington, Chattanooga, TN (US); David Latimore Hughes, Jr., Signal Mountain, TN (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 17/458,685

(22) Filed: Aug. 27, 2021

(51) Int. Cl.
*F16L 41/06* (2006.01)
*F16L 55/105* (2006.01)

(52) U.S. Cl.
CPC ............ *F16L 41/06* (2013.01); *F16L 55/105* (2013.01)

(58) Field of Classification Search
CPC ..... F16L 41/06; F16L 41/04; Y10T 137/8158; Y10T 137/8225
See application file for complete search history.

(56) References Cited

U.S. PATENT DOCUMENTS

| | | | | |
|---|---|---|---|---|
| 5,964,240 A * | 10/1999 | Granovski | ............. | F16L 41/06 408/112 |
| 6,648,562 B1 * | 11/2003 | Calkins | ................... | F16L 41/04 408/101 |
| 7,316,176 B2 * | 1/2008 | Dunn | ....................... | G01D 5/28 348/82 |
| 7,441,993 B2 * | 10/2008 | Evans | .................... | F16L 41/06 408/100 |
| 10,473,560 B2 * | 11/2019 | Nelson | ..................... | G01N 1/08 |
| 2007/0104547 A1 * | 5/2007 | Russell | ................... | F16L 41/06 408/1 R |

* cited by examiner

*Primary Examiner* — Reinaldo Sanchez-Medina
(74) *Attorney, Agent, or Firm* — Taylor English Duma LLP

(57) ABSTRACT

A cut warning system can include a valve sleeve defining a cavity, the valve sleeve defining a bottom sealing surface within the cavity; a pipeline extending through the cavity; a drilling machine including a shell cutter, the shell cutter defining a bottom edge, the drilling machine configured to axially advance the shell cutter from a pre-engagement position towards the bottom sealing surface, the pipeline positioned between the shell cutter and the bottom sealing surface in the pre-engagement position; and a signaling element positioned within the cavity, the signaling element configured to produce a signal when the shell cutter reaches a post-engagement position, the bottom edge being axially positioned between the pipeline and the bottom sealing surface.

20 Claims, 6 Drawing Sheets

INSERT VALVE CUT WARNING SYSTEM

TECHNICAL FIELD

This disclosure relates to a cut warning system. More specifically, this disclosure relates to a cut warning system for use with an insert valve on a pipeline.

BACKGROUND

Insertion valves are a type of valve that can be inserted into an existing pipeline without depressurizing the existing line. Typically, first, a valve sleeve is clamped, welded, or otherwise attached, and sealed around an existing pipeline. The sleeve has a flange, and a temporary valve, such as a knife gate valve, can be bolted to the sleeve. A drilling machine can then be attached to the temporary valve opposite from the valve sleeve. The drilling machine can hold a shell cutter in a sealed enclosure. The temporary valve can be opened, and the shell cutter can be advanced through the temporary valve and engaged with the pipeline. The drilling machine commonly advances the shell cutter completely through the pipeline, thereby severing the existing pipeline. The drilling machine can then retract the shell cutter, along with a portion of the pipeline that has been cut free (also called a "coupon"). The temporary valve can then be closed, and the drilling machine can either be replaced with a different machine or reconfigured to install a valve plug between the severed ends of the pipeline.

The valve plug typically comprises a valve member and a plug body, which effectively acts as the valve seat for the valve member. In order for the valve plug to successfully stop the flow of fluids through the pipeline when the valve member seals with the plug body, the plug body must form a seal within the valve sleeve. If the interior surface of the valve sleeve is damaged, such as if the shell cutter travels too far after fully penetrating the pipeline and contacts the interior of the valve sleeve, then the valve plug may not successfully seal with the valve sleeve. This outcome is unsatisfactory and rectification requires substantial additional time and material resources.

The drilling machines are generally sized to perform a range of functions on pipelines of varying diameter; therefore, it is common for the drilling machines to have enough travel range to contact the valve sleeve with the shell cutter. Existing methods for monitoring or limiting the travel of the drill machines rely on indirect measurements to determine or limit the position of the shell cutter. These methods are vulnerable to operator error, such as in the determination of where the limit should be or the setup of the limiting mechanism.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a cut warning system comprising a valve sleeve defining a cavity, the valve sleeve defining a bottom sealing surface within the cavity; a pipeline extending through the cavity; a drilling machine comprising a shell cutter, the shell cutter defining a bottom edge, the drilling machine configured to axially advance the shell cutter from a pre-engagement position towards the bottom sealing surface, the pipeline positioned between the shell cutter and the bottom sealing surface in the pre-engagement position; and a signaling element positioned within the cavity, the signaling element configured to produce a signal when the shell cutter reaches a post-engagement position, the bottom edge being axially positioned between the pipeline and the bottom sealing surface.

Also disclosed is a cut warning system comprising a valve sleeve defining an outer surface and an inner surface, the inner surface defining a cavity; a shell cutter inserted into the cavity, the shell cutter movable within the cavity along an axis; and a signaling element positioned in communication with the cavity, the signaling element configured to detect at least one axial position of the shell cutter within the cavity.

Also disclosed is a method for using a cut warning system, the method comprising axially translating a shell cutter along an axis within a cavity from a pre-engagement position to contact a pipeline with the shell cutter, the cavity defined by a valve sleeve, the pipeline extending through the valve sleeve and the cavity, the valve sleeve defining an opening and a bottom sealing surface opposite from the opening, the axis extending between the opening and the bottom sealing surface, the shell cutter positioned in the pre-engagement position when the pipeline is positioned between the shell cutter and the bottom sealing surface; cutting the pipeline by rotating the shell cutter about the axis while axially advancing the shell cutter to a post-engagement position, the shell cutter positioned in the post-engagement position when a bottom edge of the shell cutter is positioned between the pipeline and the bottom sealing surface; and producing a signal with a signaling element, the sensor signaling element positioned within the cavity when the shell cutter reaches the post-engagement position.

a method for using a cut warning system, the method comprising axially translating a shell cutter along an axis within a cavity from a pre-engagement position to contact a pipeline with the shell cutter, the cavity defined by a valve sleeve, the pipeline extending through the valve sleeve and the cavity, the valve sleeve defining an opening and a bottom sealing surface opposite from the opening, the axis extending between the opening and the bottom sealing surface, the shell cutter positioned in the pre-engagement position when the pipeline is positioned between the shell cutter and the bottom sealing surface; cutting the pipeline by rotating the shell cutter about the axis while axially advancing the shell cutter to a post-engagement position, the shell cutter positioned in the post-engagement position when a bottom edge of the shell cutter is positioned between the pipeline and the bottom sealing surface; and producing a signal with a sensor, the sensor positioned within the cavity when the shell cutter reaches the post-engagement position.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale.

Corresponding features and components throughout the figures may be designated by matching reference characters for the sake of consistency and clarity.

DETAILED DESCRIPTION

Figure 1:
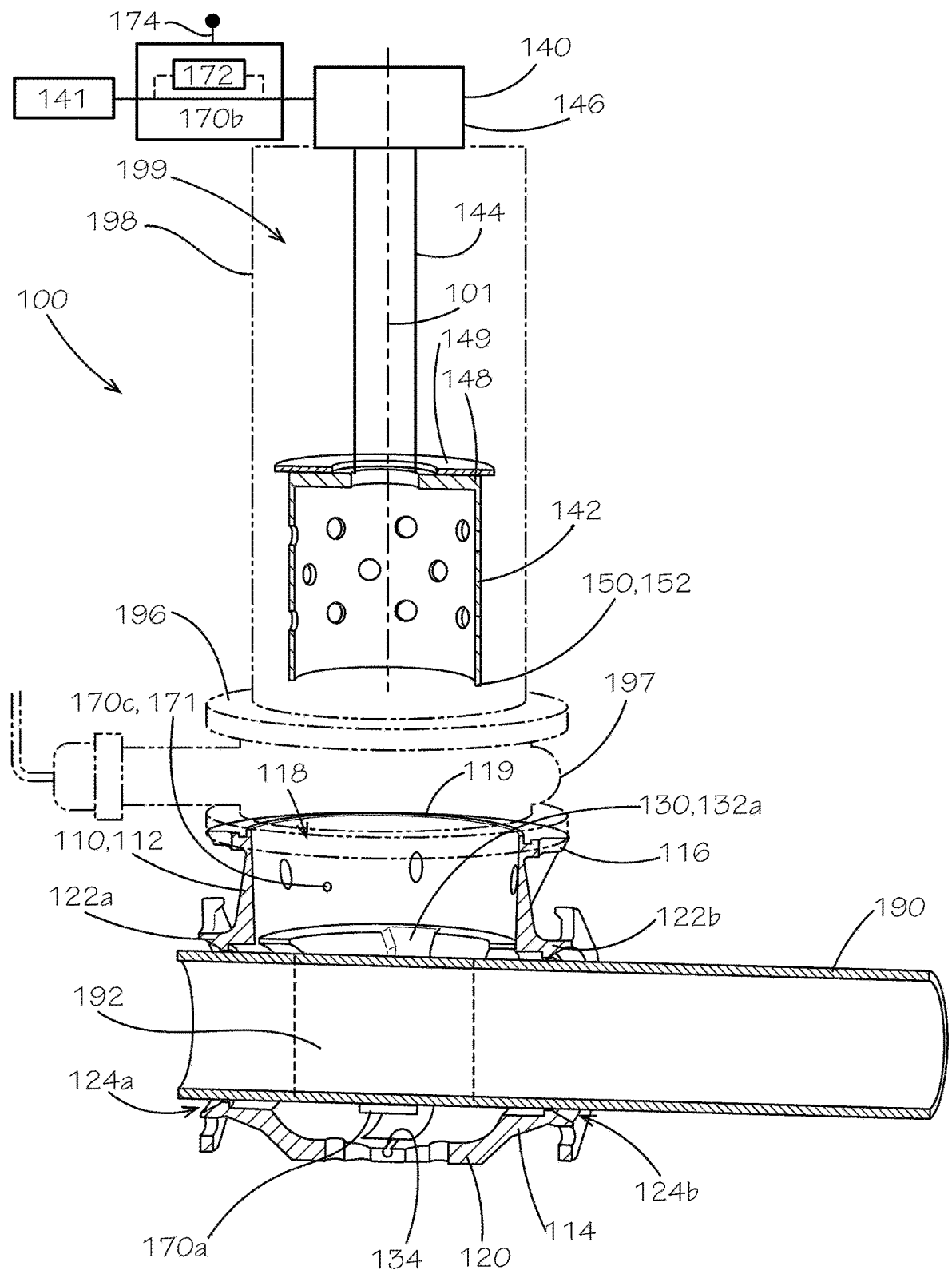
FIG. 1 is a perspective cross-sectional view of a cut warning system comprising a valve sleeve, a pipeline, a drilling machine, and three aspects of a signaling element in accordance with various aspects of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed, that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a cut warning system and associated methods, systems, devices, and various apparatus. The cut warning system can comprise a valve sleeve, a pipeline, a drilling machine, and a signaling element. It would be understood by one of skill in the art that the disclosed cut warning system is described in but a few exemplary aspects among many. No particular terminology or description should be considered limiting on the disclosure or the scope of any claims issuing therefrom.

FIG. 1 is a perspective cross-sectional view of a cut warning system 100 in accordance with one aspect of the present disclosure. The cut warning system 100 can comprise a valve sleeve 110, a pipeline 190, a drilling machine 140, and three aspects of a signaling element 170a,b,c. The signaling elements 170a,b,c can be utilized in conjunction with one another or independently from one another in various aspects.

In the aspect shown, the valve sleeve 110 can be a clamp-style valve sleeve comprising a top half 112 and a bottom half 114. The top half 112 and the bottom half 114 can be configured to clamp around and seal with the pipeline 190. The top half 112 can define a sleeve flange 116. The valve sleeve 110 can define a cavity 118 surrounding a portion of the pipeline 190 that extends through the valve sleeve 110. The cavity 118 can extend into the valve sleeve 110 from an opening 119 of the sleeve flange 116 towards a bottom end 120 of the valve sleeve 110. The valve sleeve 110 can define a first pipe collar 122a and a second pipe collar 122b, which can respectively define openings 124a,b. The pipeline 190 can extend through the openings 124a,b, and the pipe collars 122a,b can seal around the pipeline 190.

The valve sleeve 110 can define a seating portion 130 configured to seal with a plug body (not shown) of a valve plug (not shown), such as those seen in the Mueller H-800 and H-2361 Inserting Valves. The valve plug can also comprise a valve member (not shown), configured to seal with the plug body, and installation of the valve plug within the valve sleeve 110 can complete an insertion valve capable of stopping fluid flow through the pipeline 190. The seating portion 130 can comprise a pair of side sealing surfaces 132a,b (side sealing surface 132b shown in FIG. 4) and a bottom sealing surface 134 defined within the cavity 118 by the bottom end 120.

The drilling machine 140 can comprise a shell cutter 142, a boring bar 144, and a drive assembly 146. The shell cutter 142 can define a top end 148 and a bottom end 150. The bottom end 150 can define a bottom edge 152, which in some aspects can be defined by one or more teeth (not shown). The boring bar 144 can be coupled to the top end 148 and the drive assembly 146 at opposite ends of the boring bar 144. The drive assembly 146 can be configured to rotate the boring bar 144 and the shell cutter 142 about an axis 101 as well as to axially translate the boring bar 144 and the shell cutter 142 along the axis 101. The drive assembly 146 can comprise one or more motors (not shown), which can be controlled by a power supply 141.

The drilling machine 140 can be coupled to the valve sleeve 110. Specifically, the drilling machine 140 can attach to one end of a housing 198, and the housing 198 can attach to a valve 197 at the opposite end. In some aspects, a bottom flange 196 of the housing 198 can couple to the valve 197. The housing 198 and the valve 197 are shown in transparency in FIG. 1 for clarity. The valve 197 can also be attached to the sleeve flange 116 at the opposite end from the housing 198. In some aspects, the valve 197 can be a gate valve, such as a knife valve as is well known in the art. In other aspects, the valve 197 can be a different type of valve as desired. The housing 198 can define a housing cavity 199. The boring bar 144 and the shell cutter 142 can extend into the housing cavity 199. The valve 197 can be opened and closed to selectively connect and isolate the housing cavity 199 from the cavity 118 of the valve sleeve 110. With the valve 197 open and the cavities 118,199 connected in fluid communication, the drilling machine 140 can rotate and axially advance the boring bar 144 and the shell cutter 142 to cut out a portion 192 of the pipeline 190, as denoted by the dashed lines. The portion 192 may be referred to as a "coupon portion 192" once the cut is complete and the portion 192 has been severed from the remaining pipeline 190.

Drilling machines, such as the Mueller D-5, CL-12, and Mega-Lite drilling machines for example, can be sized to cut pipelines 190 of varying diameters. To accommodate this range of diameters, drilling machines commonly demonstrate a wide travel range along the axis 101. Accordingly, drilling machines are frequently capable of over travel, wherein the drilling machine 140 can axially translate the shell cutter 142 too far along the axis 101 so that the shell cutter 142 cuts into the bottom end 120 of the valve sleeve 110. This can cause damage to the bottom sealing surface 134, which can prevent the valve plug (not shown) from sealing with the seating portion 130, thereby rendering the valve sleeve 110 unsatisfactory for installing an insertion valve on the pipeline 190.

The signaling elements 170a,b,c can be configured to prevent the drilling machine 140 from contacting the shell cutter 142 with the valve sleeve 110 through a variety of mechanisms.

The signaling element 170a can be an accelerometer, which can be attached to the portion 192 of the pipeline 190 that is cut by the shell cutter 142. As the shell cutter 142 axially advances through the pipeline 190, the portion 192 can remain substantially stationary so long as it remains partially connected to the remainder of the pipeline 190. At the moment that the portion 192 is cut free from the remainder of the pipeline 190, the portion 192 can be captured within the shell cutter 142 and rotated about the axis 101 by the drilling machine 140. The bottom end 150 and the bottom edge 152 can be axially positioned between the remainder of the pipeline 190 and the bottom sealing surface 134, relative to the axis 101, at approximately the moment that the portion 192 is cut free. This position can be referred to as a "post-engagement position." Once the coupon portion 192, and the signaling element 170a attached to it, begin to rotate about the axis 101, the rotational acceleration detected by the signaling element 170a can cause the signaling element 170a to emit a signal, which can directly or indirectly stop the drilling machine 140.

As a non-limiting example of a direct method of stopping the drilling machine 140, the signaling element 170a can transmit an electrical signal, such as through a wire or wirelessly, such as with a radio transmitter, Bluetooth, or WiFi technology, for example and without limitation, which can disengage the drilling machine 140. In some aspects, the drilling machine 140 can receive the signal and cease the drilling operation. In some aspects, the power supply 141 can receive the signal and cut power to the drilling machine 140. As a non-limiting example of an indirect method of stopping the drilling machine 140, the signaling element 170a can transmit the electrical signal, which in turn can provide an indication to a human operator to disengage the drilling machine 140. For example and without limitation, the signaling element 170a can trigger a visual, auditory, and/or other sensory notification to the operator instructing the operator to disengage the drilling machine 140 at that time.

Signaling element 170b can operate by monitoring the power supplied from the power supply 141 to the drilling machine 140, and the signaling element 170b can prevent over-travel of the shell cutter 142 based on fluctuations in the power supply 141. In some aspects, the signaling element 170b can comprise a processor 172, which can monitor the power supplied from the power supply 141 to the drilling machine 140. For example and without limitation, in aspects of the drilling machine 140 wherein one or more motors of the drive assembly 146 comprise electric motor(s), the signaling element 170b can monitor current and voltage supplied to the drilling machine 140. For example and without limitation, in aspects of the drilling machine 140 wherein the one or more motors of the drive assembly 146 comprise hydraulic motor(s), the signaling element 170b can monitor pressure and flow rate of the hydraulic fluid supplied to the drilling machine 140. In some aspects, the signaling element 170b can comprise an antenna 174. The antenna 174 can be external (as shown) or internal in various aspects. The antenna 174 can be coupled in electrical communication with the processor 172. In some aspects, the signaling element 170b can be wired to communicate with other components, such as the power supply 141 and/or the drilling machine 140 (as shown) or a control panel (not shown).

During the drilling/cutting operation, the shell cutter 142 can be positioned in a pre-engagement position wherein the bottom end 150 of the shell cutter 142 is spaced above and part from the pipeline 190 along the axis 101. Prior to contact with the pipeline 190, the shell cutter 142 can be rotated freely by the drilling machine 140 with minimal power consumption. As the drilling machine 140 axially translates downwards and initially contacts the shell cutter 142 with the pipeline 190, power consumption of the drilling machine 140 can fluctuate, such as by increasing, due to the increase load placed on the drilling machine 140 due to resistance between the shell cutter 142 and the pipeline 190. Once the drilling machine 140 completes the cut, the bottom edge 152 at the bottom end 150 of the shell cutter 142 can reach the post-engagement position, wherein the bottom edge 152 can be axially positioned between the remainder of the pipeline 190 and the bottom sealing surface 134, relative to the axis 101. At this time, the load on the drilling machine 140 can drop, and the power consumption of the drilling machine 140 can decrease. The signaling element 170b can detect this pattern of increased and decreased consumption, and the signaling element 170b can emit a signal to directly or indirectly halt the drilling machine 140, as similarly described above. In some aspects, the signaling element 170b can be a switch or valve, and the signal can take the form of cutting the supply of electricity or hydraulic fluid to the drill machine 140. In some aspects, the signaling element 170b can emit an electrical signal, such as through wires or wirelessly through the antenna 174, to directly or indirectly halt the drilling machine 140.

In some aspects, such as the aspect described below with respect to FIG. 4, sacrificial members 470a,b (shown in FIG. 4, referred to hereafter as sacrificial member 470) can be positioned at least partially between the pipeline 190 and the bottom end 120 of the valve sleeve 110 to protect the bottom sealing surface 134. In such aspects, the drilling machine 140 can be permitted to advance the shell cutter 142 until it contacts the sacrificial member 470. In such aspects, the signaling element 170b can detect a power consumption pattern for the drilling machine 140 comprising an initial increase in power consumption when the shell cutter 142 initially engages the pipeline 190, a decrease in power consumption when the shell cutter 142 completes the cut through the pipeline 190, and a second increase in power consumption when the shell cutter 142 engages the sacrificial member 470. In some aspects, the sacrificial member 470 can comprise a tougher material than the pipeline 190, such as hardened steel, carbide, or another suitable material, that the shell cutter 142 cannot cut through. In such aspects, as the shell cutter 142 dulls and progress ceases, the signaling element 170b can cut power to the drilling machine 140, not unlike a fuse or breaker responding to an excessive power surge. In some aspects, the signaling element 170b can be a mechanical device, such as a clutch, which can provide the signal in the form of mechanical disengagement of the drilling machine 140 once a force resisting the axial translation of the shell cutter 142 exceeds a specified threshold.

Figure 2:
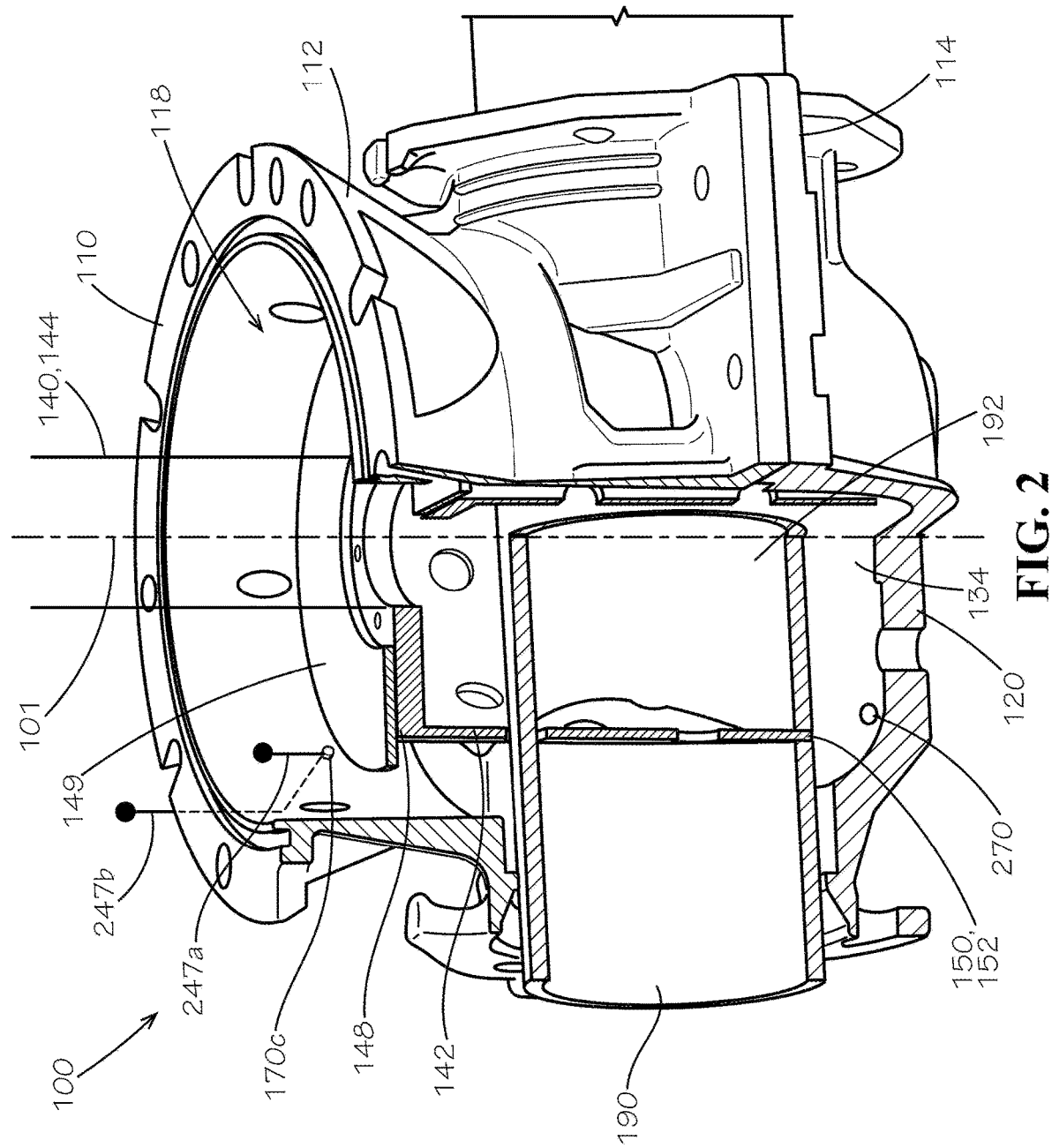
FIG. 2 is a perspective cross-sectional view of the cut warning system comprising one of the aspects of the signaling element of FIG. 1.

One method of operation of the signaling element 170c is demonstrated by FIGS. 1 and 2. FIG. 1 shows the shell cutter 142 in the pre-engagement position, while FIG. 2 shows the shell cutter 142 in the post-engagement position. The signaling element 170c can be a proximity sensor. For example and without limitation, the signaling element 170c can be a sensor 171, such as an optical, ultrasonic, magnetic, or other suitable type of proximity sensor, for example and without limitation. The signaling element 170c can be positioned within the cavity 118 so that a distance between the signaling element 170c and some portion of the drilling machine 140 can change at the moment that the shell cutter 142 completes the cut, thereby positioning the bottom edge 152 at the bottom end 150 between the remainder of the pipeline 190 and the bottom sealing surface 134 in the post-engagement position (shown in FIG. 2). For example and without limitation, the shell cutter 142 can be larger in diameter than the boring bar 144. The signaling element 170c can be axially positioned and facing radially inward relative to the axis 101 so that as the shell cutter 142 completes the cut, the top end 148 axially translates just below the signaling element 170c. At that moment, the signaling element 170c can cease to detect a first, shorter distance between the signaling element 170c and the shell cutter 142, and, instead, the shell cutter 142 can detect a second, longer distance between the signaling element 170c and the boring bar 144. In response, the signaling element 170c can produce a signal to directly or indirectly stop the drilling machine 140.

Alternatively, in some aspects, the drilling machine 140 can comprise a plate 149 positioned atop the top end 148 of the shell cutter 142. The plate 149 can be larger in diameter than the shell cutter 142. In aspects comprising the plate 149, once the shell cutter 142 reaches the post-engagement position, the signaling element 170c can be aligned with the plate 149. At that moment, the signaling element 170c can cease to detect a first, longer distance between the signaling element 170c and the shell cutter 142, and, instead, the shell cutter 142 can detect a second, shorter distance between the signaling element 170c and the plate 149. In response, the signaling element 170c can produce a signal to directly or indirectly stop the drilling machine 140. The shell cutter 142 or any component coupled directly or indirectly to the shell cutter 142, such as the plate 149 or any portion of the drilling machine 140, such as the boring bar 144 for example and without limitation, can act as a target for the signaling element 170c, such as to detect the presence of the target at a specific axial position or to measure a distance from the signaling element 170c to the target.

FIG. 2 demonstrates various aspects of an antenna 274a,b. The antenna 274a,b can be comprised by the signaling element 170c. The antenna 274a can be positioned within the cavity 118. The antenna 274b can be positioned external to the cavity 118. For example and without limitation, either the antenna 274b or a wire coupled to the antenna 274b can extend through, or penetrate, the valve sleeve 110. In some aspects, the antenna 274b or a wire coupled to the antenna 274b can extend through, or penetrate, the top half 112 of the valve sleeve 110 as shown. In aspects wherein the signaling element 170c is positioned in alternative placement 270, as described in greater detail in the following paragraph, the antenna 274b or a wire coupled to the antenna 274b can extend through, or penetrate, the bottom half 114 of the valve sleeve 110. The antenna 274a,b can wirelessly transmit the signal to another component, such as the power supply 141, the drilling machine 140, or the signaling element 170b (the power supply 141, the drilling machine 140, and the signaling element 170b each shown in FIG. 1) for example and without limitation.

In some aspects, rather than being coupled to the top half 112 of the valve sleeve 110, the signaling element 170c can be coupled to the bottom half 114. For example and without limitation, the signaling element 170c can be positioned at or near the bottom end 120. In such aspects, the signaling element 170c can face axially, radially, or both axially and radially inward, and the signaling element 170c can detect the bottom end 150 of the shell cutter 142 and/or the coupon portion 192 once cut free. For example and without limitation, as demonstrated by alternative placement 270 for the signaling element 170c in FIG. 2, the signaling element 170c can face upwards, parallel to the axis 101, and the signaling element 170c can detect the shell cutter 142 and/or coupon portion 192 as it nears the bottom sealing surface 134.

The signaling element 170c can be configured and/or placed to detect a single axial position of the shell cutter 142 or a range of axial positions for the shell cutter 142. For example and without limitation, in some applications and/or placements, the signal can actually, or effectively, be a binary signal indicating the presence or absence of the shell cutter 142 as a specific axial position. In some applications, the signal can be a digital or analog signal that can include a range of values, such as distances directly or indirectly measured between the signaling element 170c and the shell cutter 142 or a component attached thereto. The range of values can directly or indirectly correspond to a range of axial positions for the shell cutter 142.

Figure 3:
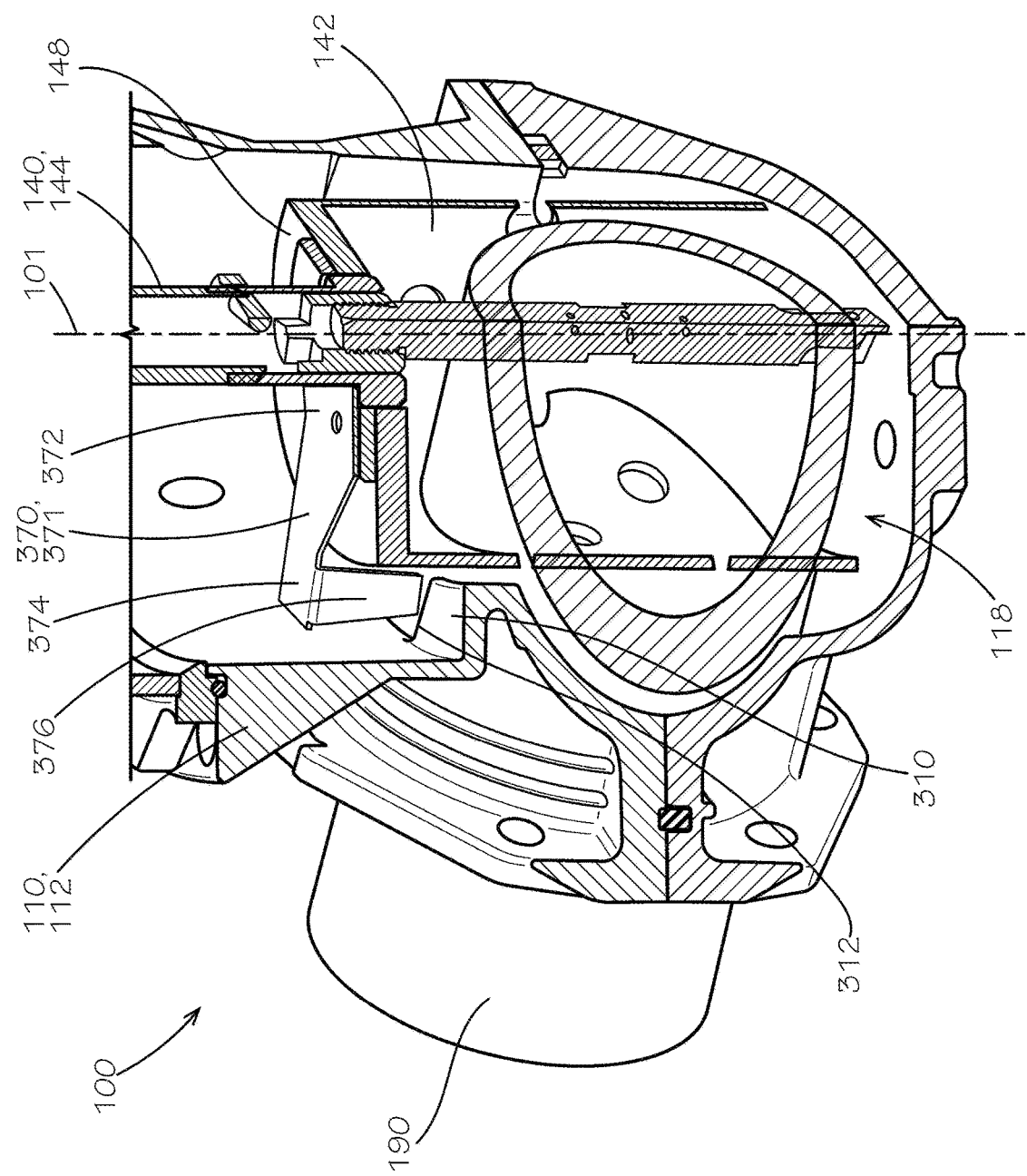
FIG. 3 is a perspective cross-sectional view of the cut warning system comprising another aspect of the signaling element in accordance with another aspect of the present disclosure.

FIG. 3 shows a perspective cross-sectional view of the cut warning system 100 comprising another aspect of the signaling element 370. The signaling element 370 can be positioned within the cavity 118 defined by the valve sleeve 110. The signaling element 370 can be coupled to the drilling machine 140. For example and without limitation, the signaling element 370 can be coupled to the boring bar 144 or to the shell cutter 142, as shown. The signaling element 370 can comprise an arm 371 and a flapper 376. The arm 371 can define a first arm end 372 and a second arm end 374. The first arm end 372 can be coupled to the drilling machine 140. Specifically, the first arm end 372 can be coupled to the top end 148 of the shell cutter 142, in the aspect shown. The arm 371 can extend substantially radially outward from the first arm end 372 to the second arm end 374, with respect to the axis 101. The second arm end 374 can be positioned radially outward from the shell cutter 142, and the flapper 376 can extend axially downwards from the second arm end 374, relative to the axis 101.

The top half 112 of the valve sleeve 110 can define a sealing shelf 310 extending circumferentially around the interior of the top half 112 within the cavity 118. The sealing shelf 310 can be configured to support and seal with the valve plug (not shown). The sealing shelf 310 can define a plurality of gaps 312 (also shown in FIG. 4). At least some of the gaps 312 can coincide with the side sealing surfaces 132a,b (shown in FIG. 4) of the seating portion 130 (shown in FIG. 4).

When the drilling machine 140 positions the shell cutter 142 in the post-engagement position, as shown, the flapper 376 can extend downwards and engage the sealing shelf 310 and the gaps 312. Rotation of the shell cutter 142 about the axis 101 can cause the flapper 376 of the signaling element 370 to engage each of the gaps 312 in turn, which can cause the signaling element 370 to elastically deflect and release. Each of these elastic cycles can produce an audible noise, which can be heard external to the cavity 118 by an operator, and the audible noises can provide a signal produced by the signaling element 370 that can indicate that the shell cutter 142 has reached the post-engagement position. This signal can inform the operator of the drilling machine 140 that the cut is complete and warn the operator not to continue advancing the shell cutter 142.

In some aspects, the highest portion, or top line, of the pipeline 190 can extend through one or more of the gaps 312 so that this portion of the pipeline 190 can be positioned above the sealing shelf 310. In such aspects, the signaling element 370 can engage the pipeline 190 to produce the signal when the shell cutter 142 is in the post-engagement position.

Figure 4:
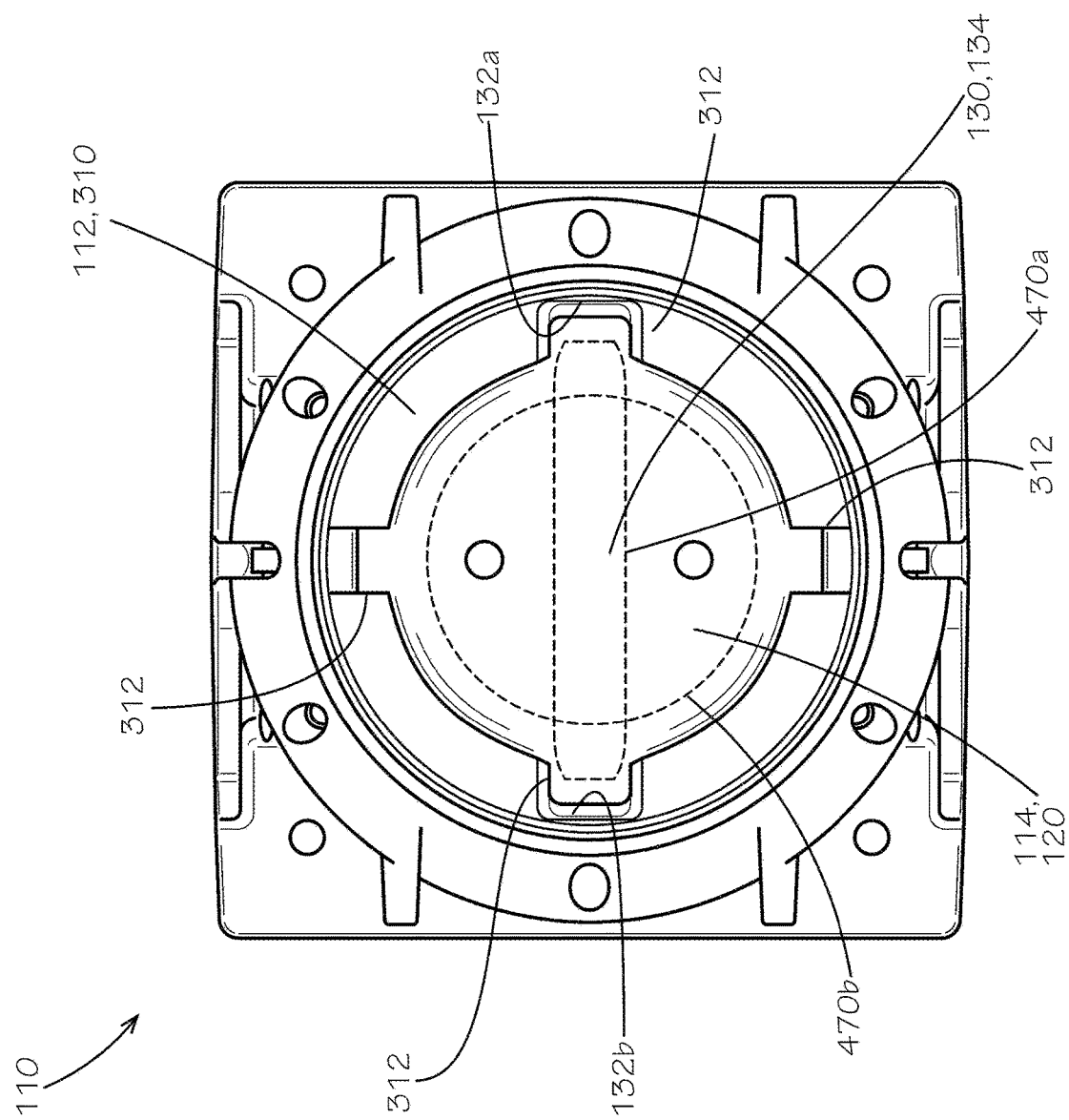
FIG. 4 is a top view of the valve sleeve of FIG. 1 comprising two aspects of a sacrificial member in accordance with various aspects of the present disclosure.

FIG. 4 is a top view of the valve sleeve 110 demonstrating two aspects of the sacrificial members 470a,b, each shown as transparent outlines. The sacrificial member 470a can be shaped to fit with a portion or the entirety of the groove defined by the seating portion 130. In the aspect shown, the sacrificial member 470a can lie within the groove of the seating portion 130, along the bottom sealing surface 134. The sacrificial member 470a can be sufficiently thick to rest above, or protrude above, surrounding portions of the bottom end 120 of the bottom half 114 of the valve sleeve 110. In some aspects, the sacrificial member 470a can engage the grooves defined by the side sealing surfaces 132a,b, such as at opposite ends of the sacrificial member 470a. In some aspects, the sacrificial member 470a can be a simple shape, such as a piece of bar stock or channel positioned within the groove of the seating portion 130. In other aspects, the sacrificial member 470a can define a more complex shape. For example and without limitation, the sacrificial member 470a can define a horseshoe shape, and portions of the sacrificial member 470a can extend at least partially up (out of the page with respect to the present viewing angle) the grooves of the side sealing surfaces 132a,b.

The sacrificial member 470b can be a simple piece of plate material sized and shaped to partially or entirely cover the bottom end 120. For example and without limitation, the sacrificial member 470b can be substantially circular in shape. In some aspects, the sacrificial member 470b can engage a portion of the groove defined by the seating portion 130. In such aspects, the sacrificial member 470b can be rotationally fixed to the valve sleeve 110. In some aspects, the sacrificial member 470b can be capable of rotating atop the bottom end 120. In such aspects, the sacrificial member 470b may not engage the groove defined by the seating portion 130.

Either sacrificial member 470a,b can prevent contact of the shell cutter 142 (shown in FIG. 1) with the bottom end 120 and/or bottom sealing surface 134. The sacrificial members 470a,b can be utilized along with, or without, any of the disclosed aspects of signaling elements, or combinations thereof. The sacrificial members 470a,b can provide primary or secondary protection to the valve sleeve 110.

Figure 5:
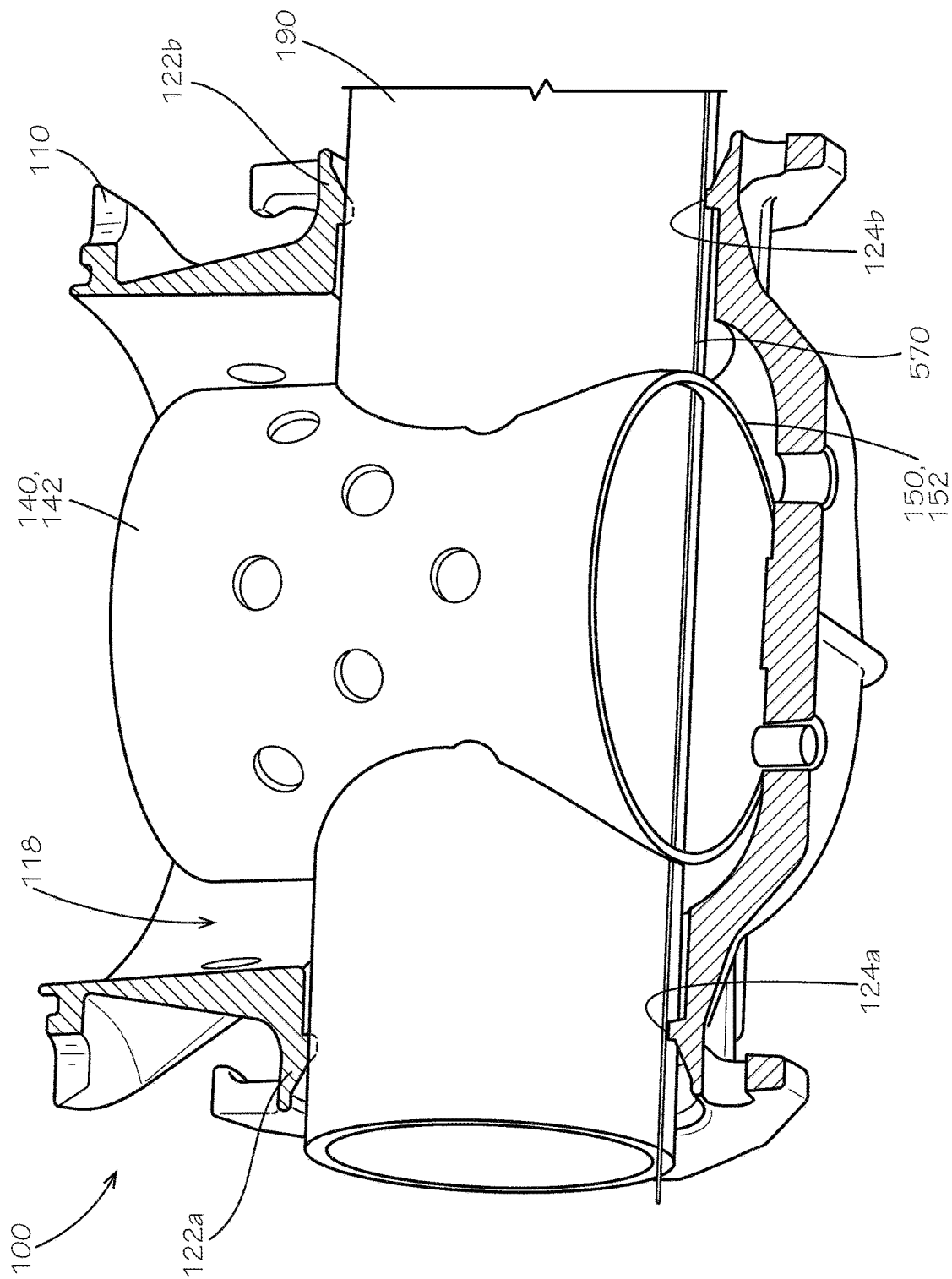
FIG. 5 is a perspective cross-sectional view of the cut warning system comprising another aspect of the signaling element in accordance with another aspect of the present disclosure.
Figure 6:
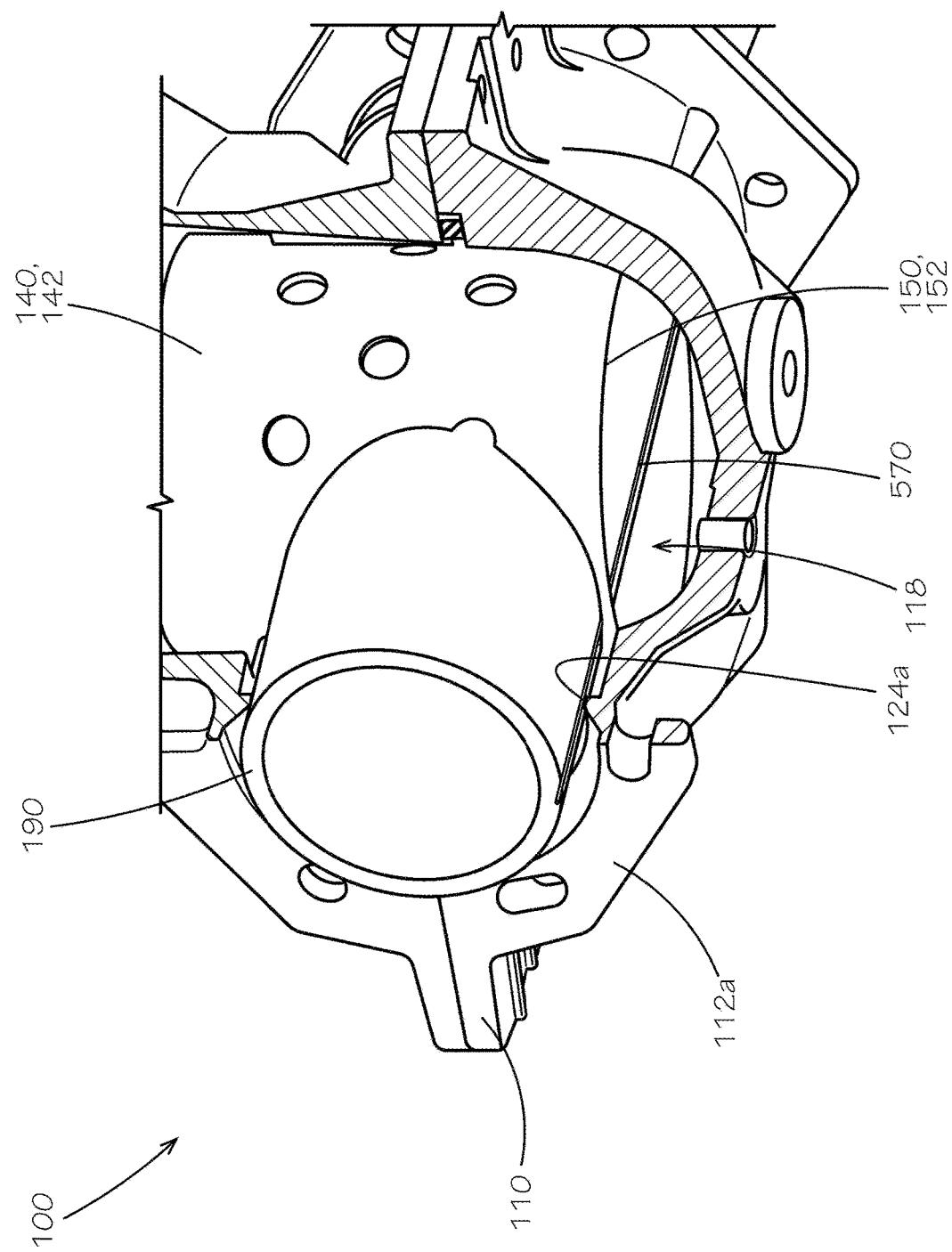
FIG. 6 is a perspective cross-sectional view of the cut warning system comprising the signaling element of FIG. 5.

FIGS. 5 and 6 show the cut warning system 100 with another aspect of the signaling element 570. The signaling element 570 can be a thin, conductive member, such as a wire, cable, ribbon, tape, fiber, or similar member. Continuity through the signaling element 570 can be monitored. For example, electrical resistance through the signaling element 570 can be monitored. In some aspects, a signal can be passed through the signaling element 570 to monitor continuity, such as current for an electrical conductor or light for a fiber optic fiber for example and without limitation, or any other communication or signaling form.

The signaling element 570 can extend through the openings 124a,b of the respective pipe collars 122a,b between the pipeline 190 and the pipe collars 122a,b, and gaskets (not shown) can seal around the signaling element 570 to prevent leaks through the openings 124a,b. Specifically, the signaling element 570 can extend through the cavity 118 of the valve sleeve 110 along the bottom-most portion, or bottom line, of the pipeline 190. Once the shell cutter 142 of the drilling machine 140 completes the cut of the pipeline 190 and reaches the post-engagement position, the bottom edge 152 of the bottom end 150 of the shell cutter 142 can contact and sever, or otherwise destroy, the signaling element 570. For example and without limitation, the signaling element 570 can act as a "dead man" mechanism, and once continuity and/or a signal carried through the signaling element 570 is disrupted, power to the drilling machine 140 can be cut. In other aspects, rather than directly disrupt the drilling machine 140, the loss of continuity can be the signal which can trigger an alarm or notification to an operator of the drilling machine 140. In some aspects, rather than extending through the openings 124a,b, the signaling element 570 can extend through one or more apertures in the valve sleeve 110.

In some aspects, a method for using the cut warning system 100 can comprise axially translating the shell cutter 142 along the axis 101 within the cavity 118 from the pre-engagement position to contact the pipeline 190 with the shell cutter 142. The cavity 118 can be defined by the valve sleeve 110. The pipeline 190 can extend through the valve sleeve 110 and the cavity 118. The valve sleeve 110 can defining the opening 119 and the bottom sealing surface 134 opposite from the opening 119. The axis 101 can extend between the opening 119 and the bottom sealing surface 134. The shell cutter 142 can be positioned in the pre-engagement position when the pipeline 190 is positioned between the shell cutter 124 and the bottom sealing surface 134.

In some aspects, the method can comprise cutting the pipeline 190, such as by rotating the shell cutter 142 about the axis 101 while axially advancing the shell cutter 142 to the post-engagement position, for example and without limitation. The shell cutter 142 can be positioned in the post-engagement position when the bottom edge 152 of the shell cutter 142 is positioned between the pipeline 190 and the bottom sealing surface 134.

In some aspects, the method can comprise producing a signal with the signaling element 170a,b,c,370,570. In some aspects, the signaling element 170a,b,c,370,570 can be positioned within the cavity 118, such as when the shell cutter 142 reaches the post-engagement position.

In some aspects, producing the signal with the sensing element 170a,b,c,370,570 can comprises vibrating the sensing element to produce the signal as an audible noise, such as where the sensing element 370 is utilized for example and without limitation.

In some aspects, the signaling element can comprise a sensor 171, such as a proximity sensor for example and without limitation. In some aspects, producing the signal with the sensor 171 can comprise positioning the shell cutter 142 or a target coupled to the shell cutter 142 in front of the proximity sensor.

In some aspects, cutting the pipeline can comprise cutting the coupon 192 free from a remainder of the pipeline 190 and rotating the coupon 192 about the axis 101 relative to the pipeline 190 when the shell cutter 142 reaches the post-engagement position. In some aspects, producing the signal with the signaling element can comprise producing the signal as an electrical signal with an accelerometer coupled to the coupon 192. In some aspects, the signaling element 170a can be the accelerometer.

In some aspects, the signaling element can comprise, or be, a conductive member coupled to a bottom of the pipeline 190. Producing the signal with the signaling element can comprise severing the conductive member; and the signal can comprise a break in electrical continuity through the conductive member.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A cut warning system comprising:
   a valve sleeve defining a cavity, the valve sleeve defining a bottom sealing surface within the cavity;
   a pipeline extending through the cavity;
   a drilling machine comprising a shell cutter, the shell cutter defining a bottom edge, the drilling machine configured to axially advance the shell cutter from a pre-engagement position towards the bottom sealing surface, the pipeline positioned between the shell cutter and the bottom sealing surface in the pre-engagement position; and
   a signaling element positioned within the cavity and coupled to the pipeline, the signaling element comprising an electrically conductive material extending between the pipeline and the bottom sealing surface and configured to produce a signal when the shell cutter reaches a post-engagement position, the bottom edge being axially positioned between the pipeline and the bottom sealing surface, wherein the signal is a disruption in an electrical continuity through the signaling element.

2. The cut warning system of claim 1, wherein the signaling element is coupled to the shell cutter.

3. The cut warning system of claim 2, wherein the signaling element is a noisemaker, and the signal is an audible sound.

4. The cut warning system of claim 1, wherein the signaling element is coupled to the valve sleeve.

5. The cut warning system of claim 4, wherein the signaling element is a proximity sensor, and wherein the signal is an electrical signal.

6. The cut warning system of claim 1, wherein the signaling element is an accelerometer coupled to a coupon portion of the pipeline, and wherein the signal is an electrical signal.

7. The cut warning system of claim 1, wherein the valve sleeve comprises a top half and a bottom half, and the signaling element is coupled to the bottom half.

8. The cut warning system of claim 1, further comprising a proximity sensor configured to detect the shell cutter when a portion of the shell cutter is positioned in front of the proximity sensor.

9. The cut warning system of claim 1, further comprising an accelerometer configured to detect at least one axial position of the shell cutter within the cavity and output an electric signal.

10. A cut warning system comprising:
a valve sleeve defining an outer surface and an inner surface, the inner surface defining a cavity;
a shell cutter inserted into the cavity and coupled to a pipeline, the shell cutter movable within the cavity along an axis; and
an accelerometer coupled to a coupon portion of the pipeline and positioned in communication with the cavity, the accelerometer configured to detect at least one axial position of the shell cutter within the cavity and output an electric signal.

11. The cut warning system of claim 10, wherein the axis extends from a flange opening of the cavity to a bottom sealing surface defined by the inner surface.

12. The cut warning system of claim 10, wherein the cavity is defined by the valve sleeve extending from the outer surface to the inner surface, and wherein the accelerometer is at least partially positioned within the cavity.

13. The cut warning system of claim 10, further comprising: a proximity sensor; and
a target coupled to the shell cutter; wherein the proximity sensor is configured to detect the target when the target is positioned in front of the proximity sensor.

14. The cut warning system of claim 10, wherein:
the valve sleeve comprises a top half fastened to a bottom half; and
the accelerometer is coupled to the bottom half.

15. The cut warning system of claim 14, further comprising a proximity sensor configured to detect the shell cutter when a portion of the shell cutter is positioned in front of the proximity sensor.

16. The cut warning system of claim 10, further comprising a noisemaker, wherein when the electric signal is transmitted to the noisemaker, the noisemaker generates an audible sound.

17. A method for using a cut warning system, the method comprising:
axially translating a shell cutter along an axis within a cavity from a pre-engagement position to contact a pipeline with the shell cutter, the cavity defined by a valve sleeve, the pipeline extending through the valve sleeve and the cavity, the valve sleeve defining an opening and a bottom sealing surface opposite from the opening, the axis extending between the opening and the bottom sealing surface, the shell cutter positioned in the pre-engagement position when the pipeline is positioned between the shell cutter and the bottom sealing surface;
cutting the pipeline by rotating the shell cutter about the axis while axially advancing the shell cutter to a post-engagement position, the shell cutter positioned in the post-engagement position when a bottom edge of the shell cutter is positioned between the pipeline and the bottom sealing surface; and
producing a signal with a conductive element coupled to a bottom of the pipeline, wherein producing the signal comprises severing the conductive element, wherein the signal comprises a break in electrical continuity through the conductive element, the conductive element positioned within the cavity when the shell cutter reaches the post-engagement position.

18. The method of claim 17, wherein:
cutting the pipeline comprises:
cutting a coupon free from a remainder of the pipeline, and
rotating the coupon about the axis relative to the pipeline when the shell cutter reaches the post-engagement position; and
producing an electrical signal with an accelerometer coupled to the coupon.

19. A cut warning system comprising:
a valve sleeve defining a cavity, the valve sleeve defining a bottom sealing surface within the cavity;
a pipeline extending through the cavity;
a drilling machine comprising a shell cutter, the shell cutter defining a bottom edge, the drilling machine configured to axially advance the shell cutter from a pre-engagement position towards the bottom sealing surface, the pipeline positioned between the shell cutter and the bottom sealing surface in the pre-engagement position; and
an accelerometer coupled to a coupon portion of the pipeline and positioned within the cavity, the accelerometer configured to produce an electric signal when the shell cutter reaches a post-engagement position, the bottom edge being axially positioned between the pipeline and the bottom sealing surface.

20. A method for using a cut warning system, the method comprising:
axially translating a shell cutter along an axis within a cavity from a pre-engagement position to contact a pipeline with the shell cutter, the cavity defined by a valve sleeve, the pipeline extending through the valve sleeve and the cavity, the valve sleeve defining an opening and a bottom sealing surface opposite from the opening, the axis extending between the opening and the bottom sealing surface, the shell cutter positioned in the pre-engagement position when the pipeline is positioned between the shell cutter and the bottom sealing surface;
cutting the pipeline by rotating the shell cutter about the axis while axially advancing the shell cutter to a post-engagement position to cut a coupon free from a remainder of the pipeline, rotating the coupon about the axis relative to the pipeline when the shell cutter reaches the post-engagement position, the shell cutter positioned in the post-engagement position when a bottom edge of the shell cutter is positioned between the pipeline and the bottom sealing surface; and producing an electrical signal with an accelerometer coupled to the coupon, the accelerometer positioned within the cavity when the shell cutter reaches the post-engagement position.

\* \* \* \* \*